2,798,081

1,5-DIHYDROXY-8-NITRO-4-ANILINOANTHRA-QUINONE COMPOUNDS

Joseph B. Dickey and Edmund B. Towne, Kingsport, Tenn., assignors to Eastman Kodak Company, Rochester, N. Y., a corporation of New Jersey No Drawing. Application January 18, 1954, Serial No. 404,772

10 Claims. (Cl. 260—380)

This invention relates to new anthraquinone compounds and their application to the art of dyeing or coloring. More particularly it relates to new anthraquinone compounds which color textile materials made of or containing a cellulose alkyl carboxylic acid ester having two to four carbon atoms in the acid groups thereof, especially cellulose acetate textile materials, blue to greenish-blue shades. The invention is also directed to a process for preparing the new anthraquinone compounds.

As well known to those skilled in the art there is a need for dyestuffs which have a satisfactory degree of affinity for cellulose acetate textile materials and which color these materials in desirable blue shades which have satisfactory fastness with respect to both light and gas. Anthraquinone dyestuffs are available which color cellulose acetate textile materials blue shades which have reasonably satisfactory fastness to light but which leave much to be desired with respect to their resistance to gas fading. Similarly, azo dyestuffs are available which color cellulose acetate textile materials blue shades which have excellent resistance to gas fading but which leave much to be desired with respect to their fastness to light.

The known anthraquinone dyestuffs which have satisfactory affinity for cellulose acetate textile materials and which color these materials blue shades having satisfactory fastness to light almost without exception leave much to be desired with respect to their resistance to gas fading. On prolonged exposure to burnt gas fumes or to ordinary city atmosphere conditions the dyeings obtained on cellulose acetate textile materials with these dyes undergo disagreeable color changes and/or a loss of strength. Depending upon the particular dyestuff, the dyeing may change from a blue shade to a reddish-blue or even a pink color. Gas fading is also known as acid fading and the two terms, as used herein, are intended to be synonymous. Efforts have been made to increase the resistance of the dyeings to gas fading by the use of inhibitors but this method is not particularly satisfactory because the application of such inhibitors is usually expensive and often inconvenient. Additionally, the effect is not permanent.

It is an object of our invention to provide new anthraquinone dyestuffs having good affinity for cellulose alkyl carboxylic acid esters, having two to four carbon atoms in the acid groups thereof, textile materials and dyeing said textile materials in level blue to greenish-blue shades which have excellent fastness to both light and gas. Another object is to provide a satisfactory process for the preparation of the new anthraquinone dyestuffs of the invention. A particular object is to provide new anthraquinone dyestuffs which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-proprionate and cellulose acetate-butyrate.

We have discovered that the new anthraquinone compounds having the probable general formula:

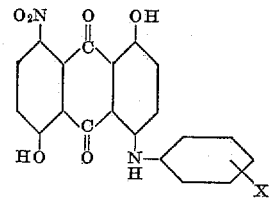

wherein X represents a member selected from the group consisting of a —(OCH₂CH₂)ₙ—OH group, wherein $n$ represents a whole number from 1 to 4, a

—(OCH₂CH₂)ₘ—OCH₃ group and a —(OCH₂CH₂)ₘ—OC₂H₅ group wherein $m$ represents a whole number from 1 to 3, are valuable dyes for coloring textile materials made of or containing a cellulose alkyl carboxylic acid ester having two to four carbon atoms in the acid groups thereof. These dye compounds when applied to the aforesaid materials give blue to greenish-blue dyeings which have outstanding light and gas fastness properties. They are particularly of use for the coloration of cellulose acetate textile materials.

Various aminoanthraquinones such as 1,4-dimethylamino-anthraquinone, 1-methylamino-4-methoxyethylaminoanthraquinone, 1-methylamino-4-β-hydroxyethylaminoanthraquinone, 1,4-diaminoanthraquinone, 1,4,5,8-tetraaminoanthraquinone, 1,4-di-β-hydroxyethylamino-5,8-dihydroxyanthraquinone and 1-amino-4-methylaminoanthraquinone-2 carboxylic amide, which are used extensively to color cellulose acetate textile materials, are markedly changed after only 1 AATCC gas-cycle. By contrast, the dyeings obtained with the dyestuffs of the present invention undergo little to practically no change in strength or shade after 1 AATCC gas-cycle and are so resistant to gas fading that for practical purposes the problem of gas fading insofar as the present dyestuffs are concerned is non-existent or nearly so.

Similarly the outstanding light-fastness of our new dyestuffs is apparent from the fact that the dyeings obtained therewith on cellulose acetate textile materials show little fading after 40 to 60 hours exposure on the Fade-O-Meter light-fastness apparatus. The significance of this will be apparent from the fact that dyeings on cellulose acetate which show little fading after 20 hours exposure on the Fade-O-Meter light-fastness apparatus are considered good.

We are aware that U. S. Patent 2,480,269 discloses anthraquinone dyestuffs obtained by reacting polyhydroxy polynitroanthraquinone compounds such as, for example, 4,8-dinitro-anthrarufin, 4,5-dinitro-chrysazin or 4,8-dinitro-anthrachrysone, with a primary aromatic amine such as aniline, toluidine, amino-ethylbenzene, amino-acetophenone, or amino-phenol, for example. However, this patent does not disclose the dyestuffs of the present application and further the dyestuffs of the present application are superior to the dyestuffs of said patent. One, the dyestuffs of the present application have better affinity for cellulose acetate textile materials and two, in general, they give more light-fast dyeings on cellulose acetate textile materials than do the dyestuffs of U. S. Patent 2,480,269.

The new anthraquinone compounds of the invention are prepared by condensing 1,5-dihydroxy-4,8-dinitro-anthraquinone with a primary arylamine having the formula:

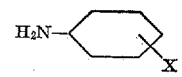

wherein X has the meaning previously assigned to it. The reaction can be carried out using an excess of the amine, usually 5 to 10 parts by weight of the amine to 1 part of 4,8-dinitro-1,5-dihydroxyanthraquinone, with or without a small amount of water being present. Also, the reaction can be carried out in the presence of an organic solvent or diluent which does not undergo reaction with the reactants. When an organic diluent or solvent is present, smaller amounts of the amine are required than when no organic diluent or solvent is employed. Although water or an organic solvent or diluent need not be present, their use is preferred. Organic solvents or diluents that can be employed include, for example, nitrobenzene, o-nitrotroluene, quinoline, quinaldine, ethyl alcohol, butyl alcohol, amyl alcohol, pyridine, 2-methyl-5-ethylpyridine, a phenol such as phenol or m-cresol, an N,N-di-(low carbon alkyl) amide of a normal fatty acid having one to three carbon atoms such as, for example, N,N-dimethyl formamide, N,N-diethyl formamide, N,N-diisopropyl formamide, N,N-dimethylacetamide, N,N-diethyl acetamide, N,N-dipropyl acetamide and N,N-dimethyl propionamide, a glycol such as, for example, ethylene glycol, propylene glycol (propandiol-1,2), trimethylene glycol (propandiol-1,3) alpha butylene glycol (butandiol-1,2), butandiol-1,3, diethylene glycol and an ether glycol such as, for example, ethyleneglycol monomethyl ether (methyl Cellosolve), ethyleneglycol monoethyl ether (Cellosolve), ethyleneglycol monobutyl ether (butyl Cellosolve), diethyleneglycol monobutyl ether (butyl Carbitol), diethylene glycol monoethyl ether (Carbitol) and diethylene glycol monomethyl ether (methyl Carbitol).

Other than selecting a temperature high enough to effect the desired reaction and not so high as to cause the formation of an appreciable amount of undesirable by-products, the exact temperature employed does not appear to be critical. Thus, temperatures ranging from about 25° C. to about 200° C. can be used although we prefer to use temperatures from about 120° C. 160° C. Ordinarily temperatures lower than about 100° C. are not used as too long a reaction time is required when such temperatures are employed.

The primary arylamines used in the preparation of the anthraquinone compounds of the invention are: o-(β-hydroxyethoxy) aniline, o-(β-hydroxyethoxyethoxy)aniline, o - (β - hydroxyethoxyethoxyethoxy)aniline, o - (β - hydroxyethoxyethoxyethoxyethoxy)aniline, o -(β - methoxyethoxy)aniline, o - (β - methoxyethoxyethoxy)aniline, o-(β-methoxyethoxyethoxyethoxy)aniline, o-(β-ethoxyethoxy)aniline, o - (β - ethoxyethoxyethoxy)aniline, o - (β - ethoxyethoxyethoxyethoxy)aniline, m - (β - hydroxyethoxy)aniline, m-(β-hydroxyethoxyethoxy)aniline, m - (β - hydroxyethoxyethoxyethoxy)aniline, m - (β - hydroxyethoxyethoxyethoxyethoxy)aniline, m - (β - methoxyethoxy)aniline, m - (β - methoxyethoxyethoxy)aniline, m - (β - methoxyethoxyethoxyethoxy)aniline, m-(β - ethoxyethoxy)aniline, m - (β - ethoxyethoxyethoxy)aniline, m - (β - ethoxyethoxyethoxyethoxy)aniline, p-(β - hydroxyethoxy)aniline, p - (β -hydroxyethoxyethoxy)aniline, p - (β - hydroxyethoxyethoxyethoxy)aniline, p - (β - hydroxyethoxyethoxyethoxyethoxy)aniline, p - (β - methoxyethoxy)aniline, p - (β - methoxyethoxyethoxy)aniline, p - (β - methoxyethoxyethoxyethoxy)aniline, p - (β - ethoxyethoxy)aniline, p - (β - ethoxyethoxyethoxy)aniline, and p - (β - ethoxyethoxyethoxyethoxy)aniline.

The following examples illustrate the anthraquinone compounds of our invention and the manner in which they are prepared.

*Example 1*

2 grams of 1,5 - dihydroxy - 4,8 - dinitroanthraquinone, 0.4 cc. of water and 15 grams of p-(β-hydroxyethoxyethoxy)aniline are heated together at 125° C.–130° C. for 4 hours under reflux. The hot reaction mixture is then diluted with 60 ccs. of ethanol and refluxed into 60 ccs. of 10% aqueous hydrochloric acid, with stirring, and allowed to cool. The dye compound which precipitates is recovered by filtration, washed neutral with water and dried. 1.8 grams of dye is obtained as a dark blue powder. It colors cellulose acetate textile materials blue shades and has the formula:

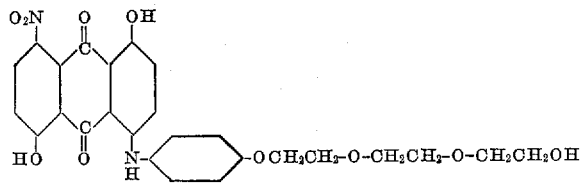

*Example 2*

By the use of 15 grams of o-(β-hydroxyethoxyethoxy)aniline in place of p-(β-hydroxyethoxyethoxyethoxy)aniline in Example 1 a dye compound is obtained which likewise colors cellulose acetate textile materials blue shades.

*Example 3*

2 grams of 1,5-dihydroxy-4,8-dinitroanthraquinone, 3 grams of o - (β - hydroxyethoxyethoxyethoxy)aniline

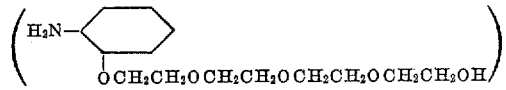

and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

*Example 4*

By the use of 3 grams of p-(β-hydroxyethoxyethoxyethoxy)aniline in place of o-(β-hydroxyethoxyethoxyethoxy)aniline in Example 3 a dye compound is obtained which similarly colors cellulose acetate textile materials blue shades.

*Example 5*

2 grams of 1,5-dihydroxy-4,8-dinitroanthraquinone, 0.4 cc. of water and 15 grams of p-(β-ethoxyethoxyethoxy)aniline are reacted together and the dye compound formed is recovered in accordance with the procedure described in Example 1. 1.4 grams of a dye compound which colors cellulose acetate textile materials blue shades is obtained.

*Example 6*

2 grams of 1,5-dihydroxy-4,8-dinitroanthraquinone, 3 grams of o-(β-methoxyethoxyethoxy)aniline and 15 ccs. of n-amyl alcohol are refluxed together for 6 hours. The reaction mixture is then cooled and poured into 100 ccs of cold 10% aqueous hydrochloric acid, with stirring. The dye compound which precipitates is recovered by filtration, washed until neutral with water and dried. It colors cellulose acetate textile materials blue shades. A yield of 1.5 grams is obtained.

*Example 7*

2 grams of 1,5-dihydroxy-4,8-dinitroanthraquinone, 3 grams of p-(β-hydroxyethoxyethoxy)aniline and 20 ccs. of quinoline are heated together at 150° C. for 4 hours. The reaction mixture is then cooled and poured into 100 ccs. of cold 10% aqueous hydrochloric acid. The dye compound which precipitates is recovered by filtration, washed with water until neutral and dried. The dye compound is obtained as a dark blue powder and colors cellulose acetate textile materials blue shades.

Example 8

2 grams of 1,5-dihydroxy-4,8-dinitroanthraquinone, 3 grams of p-($\beta$-hydroxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 9

3.28 grams of 1,5-dihydroxy-4,8-dinitroanthraquinone, 5 grams of m-($\beta$-hydroxyethoxyethoxyethoxy)aniline and 25 ccs. of diethylene glycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 10

2 grams of 1,5-dihydroxy-4,8-dinitroanthraquinone, 3 grams of o-($\beta$-hydroxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 11

2 grams of 1,5-dihydroxy-4,8-dinitroanthraquinone, 3 grams of o-($\beta$-hydroxyethoxyethoxy)aniline and 20 ccs. of ethyleneglycol are heated together at 150° C. for 4 hours. The reaction mixture is then cooled and poured into 100 ccs. of cold 10% aqueous hydrochloric acid. The dye compound which precipitates is recovered by filtration, washed with water until neutral and dried. The dye compound is obtained as a dark blue powder and colors cellulose acetate textile materials blue shades.

Example 12

3.28 grams of 1,5-dihydroxy-4,8-dinitroanthraquinone, 4.1 grams of m-($\beta$-hydroxyethoxyethoxy)aniline and 25 ccs. of diethyleneglycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. The dye compound is obtained as a dark blue powder and colors cellulose acetate textile materials blue shades.

By the use of 4.66 grams of m-($\beta$-ethoxyethoxyethoxy)-aniline in place of m-($\beta$-hydroxyethoxyethoxy)aniline in the example just given a dye compound is obtained which likewise colors cellulose acetate textile materials blue shades.

Example 13

2 grams of 1,5-dihydroxy-4,8-dinitroanthraquinone, 3 grams of o-($\beta$-methoxyethoxy)aniline and 15 ccs. of n-amyl alcohol are refluxed together for 6 hours. The reaction mixture is then cooled and poured into 100 ccs. of cold 10% aqueous hydrochloric acid, with stirring. The dye compound which precipitates is recovered by filtration, washed until neutral with water and dried. It colors cellulose acetate textile materials blue shades.

Example 14

2 grams of 1,5-dihydroxy-4,8-dinitroanthraquinone, 4 grams of p-($\beta$-ethoxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 15

2 grams of 1,5-dihydroxy-4,8-dinitroanthraquinone, 4 grams of m-($\beta$-ethoxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 16

2 grams of 1,5-dihydroxy-4,8-dinitroanthraquinone, 3 grams of m-($\beta$-methoxyethoxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 17

2 grams of 1,5-dihydroxy-4,8-dinitroanthraquinone, 4 grams of p-($\beta$-methoxyethoxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 18

2 grams of 1,5-dihydroxy-4,8-dinitroanthraquinone, 5 grams of o-($\beta$-ethoxyethoxyethoxy)aniline and 20 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 19

2 grams of 1,5-dihydroxy-4,8-dinitroanthraquinone, 5 grams of p-($\beta$-ethoxyethoxyethoxy)aniline and 20 ccs. of ethyleneglycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 20

2 grams of 1,5-dihydroxy-4,8-dinitroanthraquinone, 5 grams of p-($\beta$-methoxyethoxyethoxyethoxy)aniline and 20 ccs. of ethyleneglycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Example 21

2 grams of 1,5-dihydroxy-4,8-dinitroanthraquinone, 5 grams of o-($\beta$-ethoxyethoxyethoxyethoxy)aniline and 20 ccs. of ethyleneglycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

Compounds having the formula:

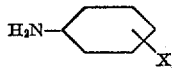

wherein X has the meaning previously assigned to it are prepared in accordance with the general procedure described in U. S. Patent 2,391,011.

The use of a solvent or diluent having the formula:

HOCH₂CH₂OQ wherein Q represents an alkyl group having 1 to 4, inclusive, carbon atoms, a β-hydroxyethyl group or a —CH₂CH₂OZ group, wherein Z represents an alkyl group having 1 to 4, inclusive, carbon atoms is described and claimed in copending Johnson and Wankel U. S. application Serial No. 242,441, filed August 17, 1951, now abandoned.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70°–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat, depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

This application is a continuation-in-part of our copending application Serial No. 242,429, filed August 17, 1951, now Patent No. 2,777,863.

We claim:
1. The anthraquinone compounds having the general formula:

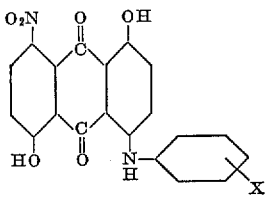

wherein X represents a member selected from the group consisting of a —(OCH₂CH₂)ₙ—OH group, wherein $n$ represents a whole number from 1 to 4, a

—(OCH₂CH₂)ₘ—OCH₃ group and a —(OCH₂CH₂)ₘ—OC₂H₅ group wherein $m$ represents a whole number from 1 to 3.

2. The anthraquinone compounds having the general formula:

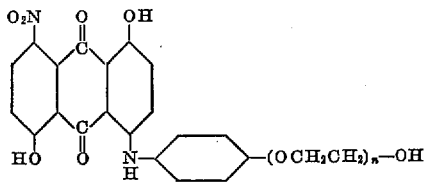

wherein $n$ represents a whole number from 1 to 4.

3. The anthraquinone compounds having the general formula:

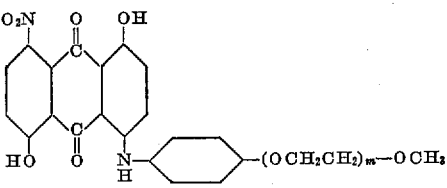

wherein $m$ represents a whole number from 1 to 3.

4. The anthraquinone compounds having the general formula:

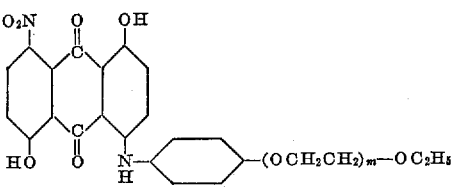

wherein $m$ represents a whole number from 1 to 3.

5. The anthraquinone compounds having the general formula:

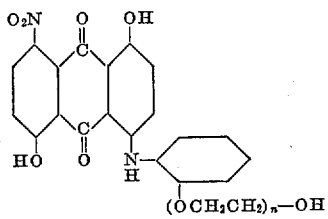

wherein $n$ represents a whole number from 1 to 4.

6. The anthraquinone compound having the formula.

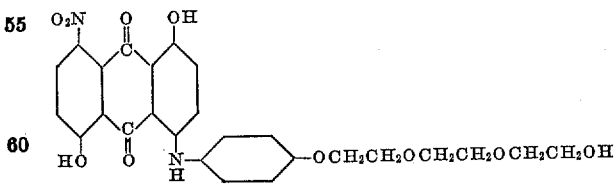

7. The anthraquinone compound having the formula:

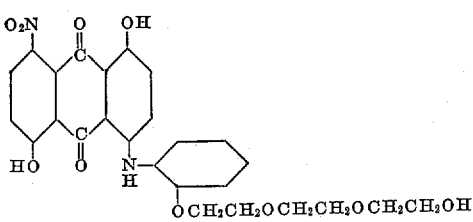

8. The anthraquinone compound having the formula:
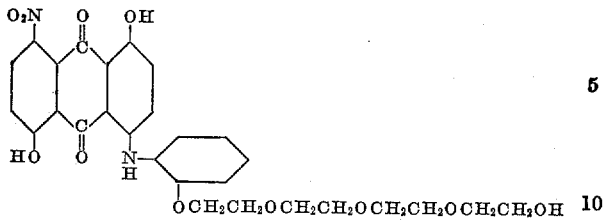
9. The anthraquinone compound having the formula:
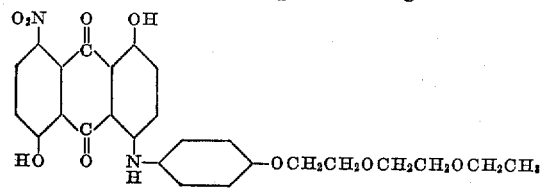
10. The anthraquinone compound having the formula:
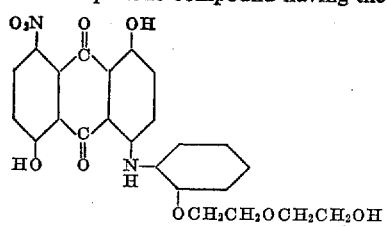
References Cited in the file of this patent
UNITED STATES PATENTS
| | | |
|---|---|---|
| 2,053,273 | Ellis | Sept. 8, 1936 |
| 2,333,384 | Klein | Nov. 2, 1943 |
| 2,341,891 | Wuertz et al. | Feb. 15, 1944 |
| 2,391,011 | Dickey et al. | Dec. 18, 1945 |
| 2,480,269 | Seymour | Aug. 30, 1949 |
| 2,726,251 | Dickey et al. | Dec. 6, 1955 |

UNITED STATES PATENT OFFICE

CERTIFICATE OF CORRECTION

Patent No. 2,798,081                                                July 2, 1957

Joseph B. Dickey et al.

It is hereby certified that error appears in the printed specification of the above numbered patent requiring correction and that the said Letters Patent should read as corrected below.

Column 3, line 49, for "anilline" read -- aniline --; column 6, line 63, Example 20, and line 73, Example 21, for "monoethyl" read -- monomethyl --, in each occurrence.

Signed and sealed this 24th day of September 1957.

(SEAL)

Attest:

KARL H. AXLINE
Attesting Officer

ROBERT C. WATSON
Commissioner of Patents